US012228403B2

(12) United States Patent
Beitia et al.

(10) Patent No.: US 12,228,403 B2
(45) Date of Patent: Feb. 18, 2025

(54) METHOD FOR MEASURING A ROTATIONAL ANGULAR VELOCITY AND/OR AN ANGULAR POSITION

(71) Applicant: JXSENS, Ecully (FR)

(72) Inventors: José Louis Beitia, Lyons (FR); Fabricio Saggin, Villeurbanne (FR)

(73) Assignee: JXSENS, Ecully (FR)

( * ) Notice: Subject to any disclaimer, the term of this patent is extended or adjusted under 35 U.S.C. 154(b) by 0 days.

(21) Appl. No.: 18/371,576

(22) Filed: Sep. 22, 2023

(65) Prior Publication Data

US 2024/0102803 A1 Mar. 28, 2024

(30) Foreign Application Priority Data

Sep. 23, 2022 (FR) ..................................... 2209684

(51) Int. Cl.
*G01C 19/06* (2006.01)
*G01P 3/46* (2006.01)
(52) U.S. Cl.
CPC .............. *G01C 19/065* (2013.01); *G01P 3/46* (2013.01)
(58) Field of Classification Search
CPC .................................................... G01C 19/065
See application file for complete search history.

(56) References Cited

U.S. PATENT DOCUMENTS 6,164,134 A * 12/2000 Cargille .................. G01P 15/14
73/504.02
6,467,346 B1 * 10/2002 Challoner ............ G01C 19/567
73/504.12

(Continued)

FOREIGN PATENT DOCUMENTS

EP 3096111 A1 11/2016

OTHER PUBLICATIONS

Wang Xu et al: "The modeling of hemispherical resonator gyro and its space applications", Seventh International Symposium on Precision Engineering Measurements and Instrumentation, SPIE, 1000 20th St. Bellingham WA 98225-6705 USA, vol. 8321, No. 1, Dec. 1, 2011 (Dec. 1, 2011), pp. 1-9.

(Continued)

*Primary Examiner* — Patrick Assouad
*Assistant Examiner* — Mark A Shabman
(74) *Attorney, Agent, or Firm* — Nath, Goldberg & Meyer; Joshua B. Goldberg

(57) ABSTRACT

Method for measuring an angular velocity and/or position comprising: (a) receiving first and second detection signals regarding a vibration from primary and secondary resonance modes of a resonator; (b) implementing at least four control loops using first, second, third and fourth regulators, respectively; and (c) estimating said angular velocity and/or position, as a function of regulator outputs. The first regulator aims at minimizing the difference between the in-phase component of the first detection signal and the product, by a first coefficient C1 that is a function of the azimuthal angle θ in the orthogonal modal base of primary and secondary modes, of a setpoint vibration amplitude of the resonator. The third regulator aims at minimizing the difference between the in-phase component of the second detection signal and the product, by a second coefficient C2 that is a function of θ and the setpoint vibration amplitude. Also, associated gyroscope sensors.

19 Claims, 8 Drawing Sheets

(56) References Cited

U.S. PATENT DOCUMENTS

| | | | | |
|---|---|---|---|---|
| 6,915,215 | B2* | 7/2005 | M'Closkey | G01C 19/56 |
| | | | | 702/32 |
| 8,210,041 | B2* | 7/2012 | Ragot | G01C 19/56 |
| | | | | 73/504.04 |
| 10,571,267 | B1* | 2/2020 | Sorenson | G01C 19/5726 |
| 11,835,339 | B1* | 12/2023 | Sorenson | G01C 19/5776 |
| 11,841,243 | B1* | 12/2023 | Pelliccione | G01C 25/00 |
| 2007/0266785 | A1* | 11/2007 | Cadarelli | G01C 19/5719 |
| | | | | 73/504.16 |
| 2015/0192415 | A1* | 7/2015 | Ge | G01C 19/5776 |
| | | | | 73/504.13 |
| 2021/0293843 | A1* | 9/2021 | Valli | H03M 3/458 |

OTHER PUBLICATIONS

French Search Report dated Jul. 28, 2023 corresponding to application No. 2209684.

* cited by examiner

METHOD FOR MEASURING A ROTATIONAL ANGULAR VELOCITY AND/OR AN ANGULAR POSITION

The present invention relates to the general technical field of rotation sensors, and more particularly that of gyroscope sensors based on Coriolis forces to measure rates of rotation and/or angular positions, such as Coriolis vibratory gyrometers or gyroscopes called CVG.

The present invention more particularly relates to a method for measuring the angular velocity and/or the angular position, about an axis of rotation by an axisymmetric vibratory gyroscope sensor.

Vibrating structure gyrometers for measuring angular velocities are well known. These vibratory gyrometers are based on Coriolis effect, which causes a vibrating object (the resonator) to undergo a force, when it rotates, to continue vibrating in a single and same so-called inertial plane. Applying an opposite force makes it possible to rotate the plane of vibration with the object. The vibration is then motionless relative to the rotating reference system linked to the object and measuring this force makes it possible to determine the angular velocity.

Axisymmetric resonators, i.e. with a symmetry of revolution about an axis, have moreover the propriety that, when no force opposite to the Coriolis forces is applied, measuring the position of the reference system linked to the rotating object with respect to the fixed vibration gives directly the object angular position information. This operating mode is called gyroscope mode, by opposition to the previous operating mode, called gyrometer mode.

Such axisymmetric CVGs generally use a resonator that is hemispherical, cylindrical, annular or polygonal in shape, with 8×k sides of identical length, equiangularly distributed, where k is a non-zero integer. In this case, the resonator has two resonance modes of identical frequencies, called primary and secondary modes, having for property to be modally orthogonal, which translates by an angle of 45 degrees in the physical space of the resonator.

These axisymmetric CVGs include advanced electronics for controlling the vibration, i.e. the primary vibration mode, as well as the secondary vibration mode, or a combination of these modes. Such electronics also implement algorithms aiming at identifying and cancelling any drift so as to obtain the highest possible measurement accuracy.

Control algorithms, also known as implementation algorithms, are generally based on principles presented in the guide IEEE 1431-2004, entitled "IEEE Standard Specification Format Guide and Test Procedure for Coriolis Vibratory Gyros". These algorithms conventionally implement four vibration control loops and are called FTR (Force To Rebalance) for a gyrometer implementation, and WA (Whole Angle) gyroscope implementation.

As regards the algorithms for correcting the sensor errors, generally associated with the bias and the scale factor, the most rudimentary ones operate out of control loop (or downstream from the loops) by simple application of compensation polynomials that are function of the temperature, and the most complex ones, using the properties of the above-mentioned CVGs with symmetric vibration modes, intervene in the control loops. These complex algorithms generally require rotating the plane of vibration whereas no inertial rotation is applied to the resonator. It is then talked about electrical rotation. To obtain that, the gyroscope mode is implemented, with addition of an electrical precession force electrically pushing the vibration in a controlled manner while keeping the vibration amplitude constant. Error compensation then involves setting up correction matrices on the detection and excitation signals, followed with other correction matrices targeting the physical errors of the sensor itself. However, and in particular when excellent performances are desired, the algorithms based on the implementation of these rotation matrices require high computational power, and can still be perfected.

The present invention improves the situation.

The objects assigned to the invention are achieved by means of a method for measuring an angular velocity of a rotation and/or an angular position, about a sensitive axis of an axisymmetric vibratory gyroscope sensor, comprising the implementation, by means for processing data from the axisymmetric vibratory gyroscope sensor, of steps of:
   (a) receiving, from an electromechanical coupling instrument of a resonator of the axisymmetric vibratory gyroscope sensor, a first detection signal regarding a vibration of said resonator according to a primary resonance mode, and a second detection signal regarding a vibration of said resonator according to a secondary resonance mode; each of the first and the second detection signal comprising an in-phase component and a phase-quadrature component; said resonator being vibrated via said electromechanical coupling instrument according to a first signal for exciting the primary resonance mode and a second signal for exciting the secondary resonance mode;
   (b) implementing at least four control loops, including:
      a first loop for controlling the vibration amplitude of the resonator about the primary resonance mode axis, using a first regulator;
      a second phase-locked loop generating in-phase and phase-quadrature reference harmonic signals of the primary mode and/or secondary mode, for separating said in-phase and phase-quadrature components of the detection signals, using a second regulator;
      a third loop for compensating for the Coriolis forces due to said rotation of the resonator exciting a resonance mode perpendicular to the vibration, using a third regulator;
      a fourth loop for controlling the quadrature of said resonance mode perpendicular to the resonator vibration, using a fourth regulator;
   (c) estimating said angular velocity and/or said angular position, as a function of the regulator outputs;
   characterized in that the vibration is constrained by the first and second excitation signals in such a way as to have an azimuthal angle in the orthogonal modal base of the primary and secondary modes, the first regulator aiming at minimizing the difference between the in-phase component of the first detection signal and the product, by a first coefficient that is function of the azimuthal angle, of a setpoint vibration amplitude of the resonator, and the third regulator aiming at minimizing the difference between the in-phase component of the second detection signal and the product, by a second coefficient that is function of the azimuthal angle, of said setpoint vibration amplitude of the resonator, the first loop being also a Coriolis force compensation loop and the third loop being also a loop for controlling the vibration amplitude of the resonator about the secondary resonance mode axis.

The objects assigned to the invention are also achieved by means of an axisymmetric vibratory gyroscope sensor for measuring an angular velocity or a rotation about a sensitive axis, comprising:

a resonator having an electromechanical coupling instrument for vibrating said resonator according to a first excitation signal coming from a primary resonance mode and a second excitation signal coming from a secondary resonance mode;

data processing means configured to:
receive, from the electromechanical coupling instrument, a first detection signal regarding a vibration of said resonator according to the primary resonance mode, and a second detection signal regarding a vibration of said resonator according to the secondary resonance mode; each of the first and the second detection signal comprising an in-phase component and a phase-quadrature component;

implementing at least four control loops, including:
a first loop for controlling the resonator vibration amplitude about the primary resonance mode axis, using a first regulator;
a second phase-locked loop generating in-phase and phase-quadrature reference harmonic signals of the primary mode and/or secondary mode, for separating said in-phase and phase-quadrature components of the detection signals, using a second regulator;
a third loop for compensating for the Coriolis forces due to said rotation of the resonator exciting a resonance mode perpendicular to the vibration, using a third regulator;
a fourth loop for controlling the quadrature of said resonance mode perpendicular to the resonator vibration, using a fourth regulator;
estimating said angular velocity and/or said angular position as a function of the regulator outputs;

characterized in that the vibration is constrained by the first and second excitation signals in such a way as to have an azimuthal angle in the orthogonal modal base of the primary and secondary modes, the first regulator aiming at minimizing the difference between the in-phase component of the first detection signal and the product, by a first coefficient that is function of the azimuthal angle, of a setpoint vibration amplitude of the resonator, and the third regulator aiming at minimizing the difference between the in-phase component of the second detection signal and the product, by a second coefficient that is function of the azimuthal angle, of said setpoint vibration amplitude of the resonator, the first loop being also a Coriolis force compensation loop and the third loop being also a loop for controlling the resonator vibration amplitude about the secondary resonance mode axis.

Moreover, the objects assigned to the invention are achieved by means of a computer program product or a program of programmable logic circuit comprising code instructions for executing a method according to the invention for measuring the angular velocity of a rotation, or an angular position, about a sensitive axis of an axisymmetric vibratory gyroscope sensor, and making it possible to deduce, from these measurements, corrections of the sensor errors to be applied to the vibration control loops to improve the performances when said program is executed on a computer or a programmable logic circuit within the implementation electronics of the sensor.

Finally, the objects assigned to the invention are achieved by means of a storage means readable by a computer system or a programmable logic circuit on which is recorded a computer program product or a program product of a programmable logic circuit comprising code instructions and fixed parameters stored for executing a method according to the invention for measuring the angular velocity of a rotation, or measuring the angular position, about a sensitive axis of an axisymmetric vibratory gyroscope sensor, and making it possible to deduce, from these measurements, corrections of the sensor errors stored on a storage means readable by a computer system or a programmable logic circuit, to be applied to the loops to improve the performances when said program is executed on a computer or programmable logic circuit within the sensor implementation electronics.

Other features and advantages of the invention will appear in more detail upon reading of the following description, with reference to the appended drawings, given by way of purely illustrative and non-limiting examples, in which.

AXISYMMETRIC VIBRATORY GYROSCOPE SENSOR

Figure 1:
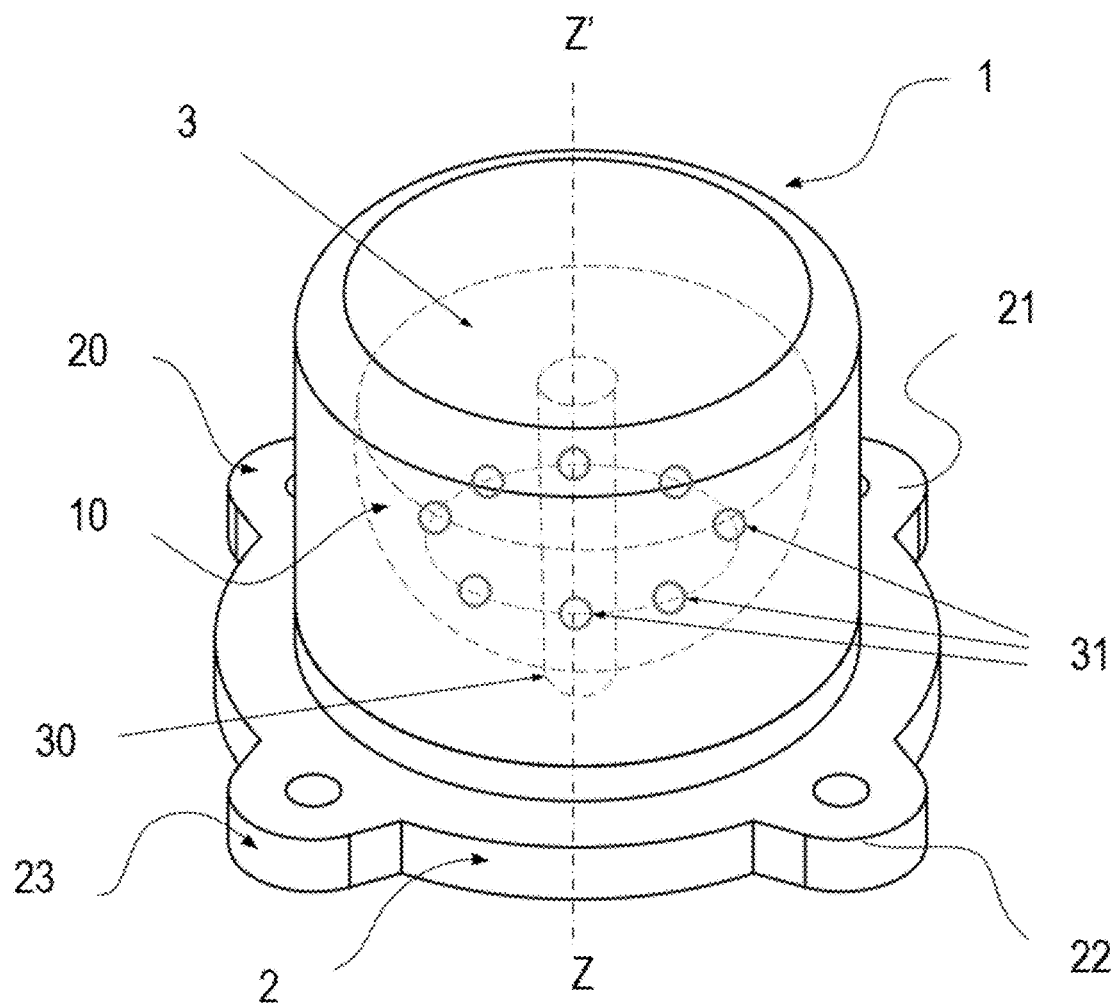
FIG. 1 illustrates, in a perspective schematic view, an axisymmetric vibratory gyroscope sensor.

The invention relates to a method for measuring the angular velocity and/or the angular position, about an axis (called the sensitive axis) by an axisymmetric vibratory gyroscope sensor 1 with respect to this sensitive axis, shown by way of example in FIG. 1, which advantageously forms a Coriolis vibratory gyroscope sensor, i.e. a rotation sensor based on the Coriolis forces. The vibratory gyroscope sensor 1 is also called vibratory inertial sensor of the CVG ("Coriolis Vibratory Gyro") type. The term "gyroscope" is generally used when that matter is to directly measure an angular position, and "gyrometer" when that matter is only to measure the angular velocity, it being understood that said gyrometer can also indirectly determine an angle by integration of the angular velocity measurements. However, in the case of the axisymmetric CVGs, this integration can be done naturally, or directly, by the vibrating element itself (the resonator 3 described hereinafter), when the control electronics implements in a preferred manner a gyroscope operating mode, also called WA (Whole Angle), as exposed hereinafter.

As illustrated in FIG. 1, the vibratory gyroscope sensor 1 generally comprises a base 2, which is for example made of metal, or ceramic material, and provides a support function. The base 2 thus advantageously forms a pedestal. The base 2 advantageously has an overall plate shape with two opposite sides, separated by the thickness of the plate, which are provided with convex and concave conformations forming accommodations whose functions will be described hereinafter. The base 2 is advantageously provided with fastening means, which are for example in the form of a plurality of lugs each passed through by a hole in order to allow the sensor 1 to be screwed to a frame, for example to the frame of an inertial unit or any other equipment used for navigation, guidance or control of a moving object in space. As illustrated by FIG. 1, the fastening means 20, 21, 22, 23 of the base 2 can be adapted to provide a fastening that is symmetric with respect to the main axis of symmetry Z-Z' of the resonator, while being equiangularly distributed around this central axis, which is advantageously normal to the mean plane in which extend the fastening lugs and/or the plate forming the base 2. Preferably, the base 2 has in this case a 4th-order discrete rotational symmetry about the central axis Z-Z'. Said central axis Z-Z' corresponds to the sensitive axis along which the vibratory gyroscope sensor 1 is adapted to measure an angular velocity and/or an angular rotation. Other cases are possible, as for example a base 2 adapted to provide an isostatic fastening with three fastenings equiangularly distributed around the central axis Z-Z'. Preferably, the base 2 has in this case a 3rd-order discrete rotational symmetry about the central axis Z-Z'.

Advantageously, the vibratory gyroscope sensor 1 according to the invention comprises a bell-shaped cap 10, that comes above the vibrating structure (resonator 3 described hereinafter) of the sensor 1. Said cap 10 is made for example of a metal material, and is advantageously intended to cooperate with the base 2 to delimit with the latter an internal space intended to receive the vibrating structure (resonator 3 described hereinafter) of the vibratory gyroscope sensor 1, in order to isolate and protect it from the external environment. The accommodation so formed by the base 2 and the cap 10 can advantageously be gas-tight, thanks to the implementation of suitable sealing means arranged at the interface between the cap 10 and the base 2, which makes it possible to control the atmosphere within the accommodation in question.

The vibratory gyroscope sensor 1 comprises, as explained, a resonator 3 that forms a proof body intended to vibrate in response to an excitation. The resonator 3 includes, as illustrated in the figures, a central foot 30 by which the resonator 3 is attached to said base 2. In other words, the vibratory gyroscope sensor 1 comprises mechanical connection means that provide a fastening of the central foot 30 to the base 2. Advantageously, said mechanical connection means provide a clamping connection between the central foot 30 and the base 2, in order to immobilize the central foot 30 relative to the base 2. The mechanical connection means have for example a definitive nature, that is to say they are non-detachable, and can consist for example of an assembly by bonding, welding or brazing of the foot 30 and the base 2.

The resonator 3 has a distal portion that is particularly hemispherical, cylindrical, annular or polygonal in shape, with 8×k sides of identical length, equiangularly distributed, where k is a non-zero integer.

Conventionally, the vibratory gyroscope sensor 1 comprises an electromechanical coupling instrument 31 attached to a proximal part of the resonator 3 (around the foot 30) itself comprising:

a plurality of excitation devices, called "forcers", to excite said resonator 3 into vibration, and in particular said primary and secondary, 2nd-order, symmetric vibration modes, of elliptic deformation, of said distal portion of the resonator 3.

a plurality of detection devices, called "pickoffs", to detect vibrations of the resonator 3, and in particular the vibrations of said distal portion, excited by the excitation devices.

This positioning of the excitation and detection devices at the proximal portion makes it possible in particular to limit the potential damping effects caused by the electromechanical coupling instrument 31 and likely to generate measurement errors.

Said excitation devices and said detection devices may be of different natures, electromagnetic, electrostatic, optical, or for example piezoelectric elements. They are generally referred to as electrodes. The elements 31 in question are thus designed so as, on the one hand, to impart, through the proximal portion to which they are fastened, vibrations to the distal portion of the resonator 3, to excite in particular the primary and secondary, 2nd-order, symmetric vibration resonance modes, of elliptic deformation, and on the other hand, to detect, here again through the proximal portion to which they are attached, the vibrations of the distal portion. The elements 31 thus provide a double function of vibratory excitation on the one hand and of vibration detection on the other hand. The nature of the excitation elements 31 can be different from the nature of the detection elements. They are fully involved in vibration control.

Figure 2:
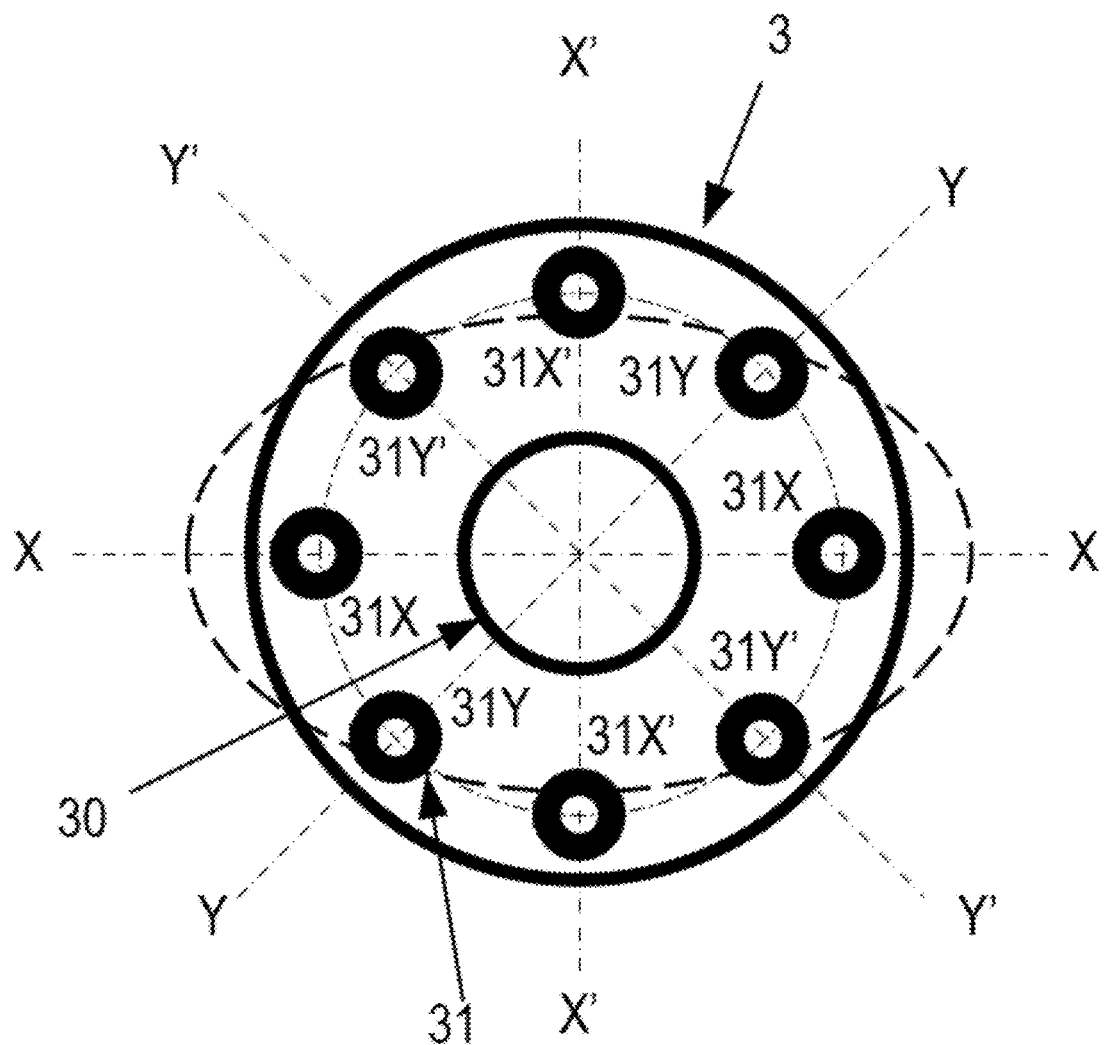
FIG. 2 illustrates, in a schematic top view, a resonator of the vibratory gyroscope sensor.

Regardless of the number of elements 31 used for implementing and controlling the primary and secondary resonance modes of the resonator, it is known that, for the axisymmetric vibratory gyroscope sensors, four signals are sufficient to perform this control. Two signals are excitation signals, denoted E1 and E2 in FIG. 3, and two signals are detection signals, denoted D1 and D2 in FIG. 3. The distribution of these signals from and towards the resonator 3 from the implementation electronics can be realized in a number of ways, and these define the number of electromechanical coupling elements 31 used. Preferentially, the number of electromagnetic coupling elements 31 is an integer multiple of eight, as illustrated in FIG. 1 and FIG. 2. But this number can more simply become a multiple of two, or equal to two, when lesser performance is acceptable, in particular when a multiplexing of detection and excitation signals is acceptable.

With reference to FIG. 2, the elements 31 (denoted 31X, 31X', 31Y and 31Y', see hereinafter) are preferentially regularly distributed over the proximal circumference of the resonator 3. For example, is there are 8 elements as shown, they are spaced apart by 45°, i.e. placed at 0° and 180° for the pair [31X], 45° and 225° for the pair [31Y], 90° and 270° for the pair [31X'], and finally 135° and 315° for the pair [31Y'].

The vibratory gyroscope sensor 1 further comprises data processing means 11 (i.e. for processing the signal) connected to the electromagnetic coupling elements 31 via interface and signal-conditioning electronics, in particular a DGB (Digital Board), a PB (Proximity Board) and an IB (Interface Board). The DGB means can include a processor, an FPGA (Field-Programmable Gate Array), a microcontroller, an ASIC (Application-Specific Integrated Circuit), etc., as well as the associated memories and clocks.

Conventionally, the Proximity Board (PB) is a board transforming the detection signals coming from the high-impedance electromagnetic coupling elements 31 DX and DY attached to the resonator into low-impedance signals therefore able to travel towards the DGB without disturbance, and transferring the excitation signals EX and EY towards the excitation elements 31 attached to the resonator. The Interface Board (IB) is a board receiving the detection signals from the PB and adapting and/or filtering them before analog-digital conversion by Analog-to-Digital Converters (ADC) at the input of the DGB (D1 and D2 denote the adapted/filtered versions of DX and DY), and adapting and/or filtering the excitation signals (denoted E1 and E2) received from the Digital-to-Analog Converters (DAC) at the output of the DGB before transmitting them to the PB, then to the resonator (then denoted EX and EY, as explained). For impedance matching of the detection signals, operational amplifiers (AOP) can also be used on the detection signals DX, DY in the PB.

FTR Mode

Figure 3:
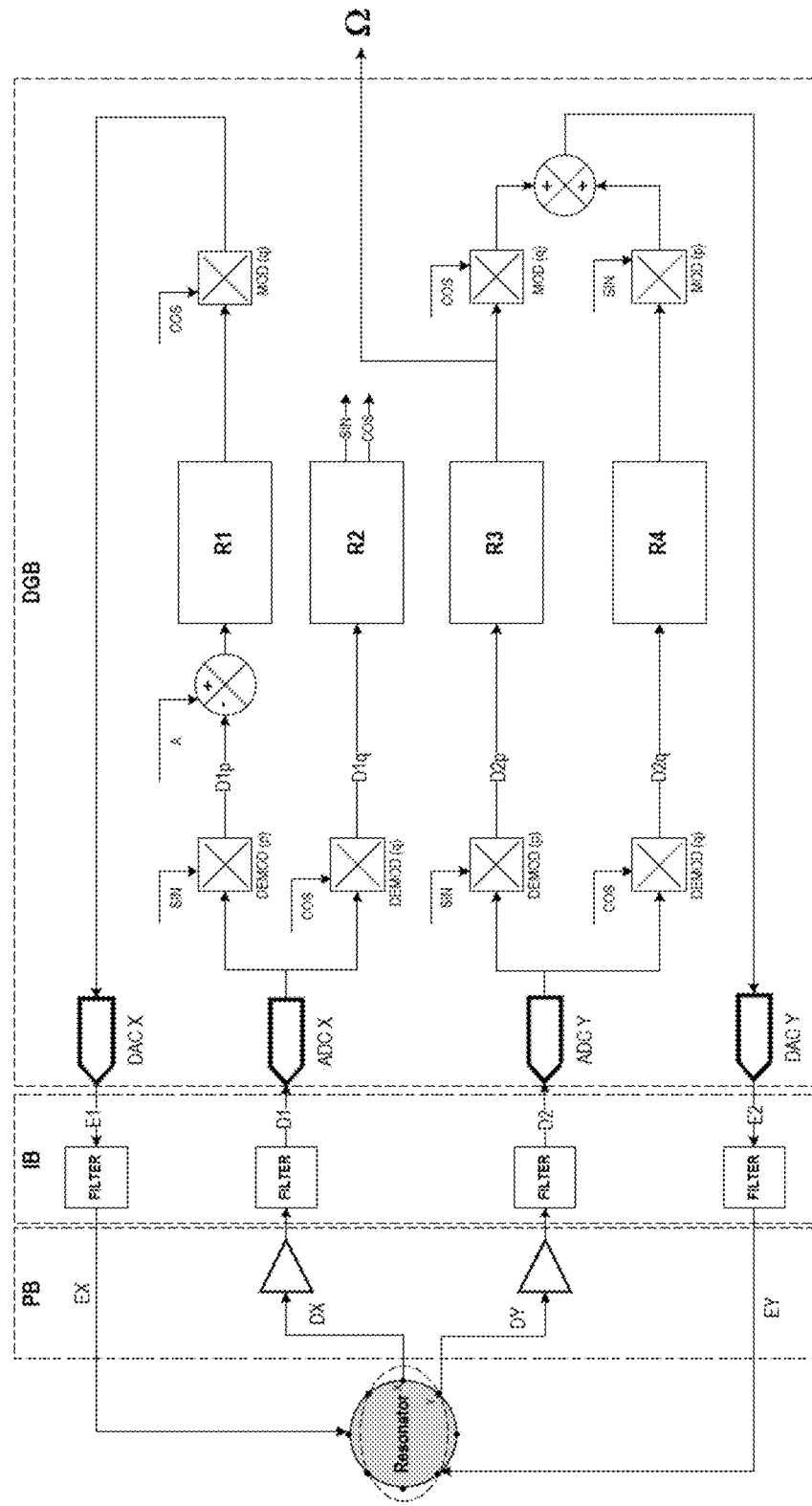
FIG. 3 shows a flowchart of a known FTR mode.

An operating mode of a vibratory gyroscope sensor 1 is known, which is called FTR (Force To Rebalance) mode, in which the vibration is constrained in the reference direction defined by the elements 31 of the resonator 3. The control system associated with this mode is shown in FIG. 3. The vibration is then aligned with the primary mode. As explained the primary and secondary modes have the property to be modally orthogonal to each other so that they can form an orthogonal modal base defining a modal plane (two-dimensional modal space) of the system. By noting θ the azimuthal angle defining the axis of the vibration in this orthogonal modal base of the primary and secondary modes (i.e. with respect to the abscissa axis of the modal plane), here θ=0°.

With reference to FIGS. 2 and 3, in a configuration with eight electromagnetic coupling elements, in the physical domain, the orientation of the great axis of the vibration for the primary mode is aligned on four first elements, with a pair 31X at 180° from each other, and other pair 31X' also at 180° from each other, the first pair being spaced apart from the second one by 90° in the physical space, and the two pairs being positioned along directions denoted X and X' in FIG. 2. The secondary mode is deduced from the primary mode by a 45° rotation in the physical space, which corresponds to a 90° rotation in the modal plane (i.e. θ=90°). This mode is also aligned on four other electromagnetic coupling elements, a pair 31Y and a pair 31Y', the elements of a pair being located at 180° from each other, the two pairs being separated by 90° and each of the pairs being aligned along directions denoted Y and Y'. The electromechanical coupling instrument 31 receives the first and second excitation signals EX and EY (inputs, via the elements 31X and 31Y, respectively), and produces the first and second detection signals DX and DY (outputs, via the elements 31X' and 31Y', respectively) that the signal and data processing means 11 will be able to interpret after normalization and filtering in a proximity board PB and/or the interface board IB.

In FIG. 2 is shown in dotted line the shape taken by the resonator 3 when the vibration is constrained in such a way as to be aligned with the primary mode, i.e. θ=0° in the modal plane (for the sake of convenience, it will be referred to as a vibration constrained in "direction θ=0°"), i.e. the main axis of the vibration coincides with the reference direction X-X of the resonator 3 in the physical space.

When the vibratory gyroscope sensor 1 rotates about its sensitive axis, the Coriolis forces that result therefrom and that act on the resonator excite the secondary mode.

The closed loop bring back the secondary resonance mode to zero, and the force required to cancel this mode is proportional to the angular velocity (denoted Ω), perpendicular to the plane of FIG. 2, or also, collinear to the sensitive axis of the resonator 3, hence the "force to rebalance" name.

It can be noticed here that the principle described hereinabove would also apply to the case in which each pair would be replaced by a single electromagnetic coupling element. In this case, only four electromagnetic coupling elements would be used. Also, when the digital implementation elements operate at a frequency that is high enough and far higher than the frequency of the sustained primary mode, the electromagnetic coupling elements could be used in shared time, alternately in excitation mode and in detection mode. In this case, theoretically, two electromagnetic coupling elements would be sufficient, instead of four, or eight, and one of them would be for example 31X and the other 31Y.

With reference to FIG. 3, we thus have at least 4 control loops in FTR mode, each comprising a regulator. In each loop, the input detection signals are demodulated in such a way as to separate an in-phase component and a phase-quadrature component. These components are respectively referred to as: D1p [in-phase component of the first detection signal, i.e. in-phase component of the vibration according to the first mode], D1q [phase-quadrature component of the first detection signal, i.e. phase-quadrature component of the vibration according to the primary mode], D2p [in-phase component of the second detection signal, i.e. in-phase component of the vibration according to the secondary mode], and D2q [phase-quadrature component of the second detection signal, i.e. phase-quadrature component of the vibration according to the secondary mode]. Symmetrically, the outputs of the regulators are inversely remodulated to obtain the excitation signals E1 and E2, or EX and EY after filtering.

The first loop is for controlling the amplitude (setpoint amplitude denoted A) of the in-phase component of the primary mode deduced from the first detection data DX. It implements a regulator R1 whose output is the command denoted CA (Command of Amplitude) determining the first excitation signal EX.

The second loop is a phase-locked loop (PLL) with a regulator R2 locking the system on the frequency of the primary mode and generating, from the phase-quadrature component of the primary mode deduced from the first detection data DX, reference harmonic signals SIN and COS, respectively in phase and in phase-quadrature with the primary mode. These reference signals are used in all the control loops for modulating the detection signal and modulating the control forces applied to the resonator.

The third loop is that which implements the Coriolis force compensation on the in-phase component of the secondary mode deduced from the second detection data DY (this controls aims at cancelling this phase from the secondary mode) with a regulator R3 that outputs the command denoted CP (Control of Precession). This command is proportional to the angular velocity Ω.

The fourth loop is for controlling the quadrature of the phase-quadrature component of the second mode deduced from the second detection data DY (this control aims at cancelling this phase-quadrature from the secondary mode) so that the oscillation of the resonator 3 remains a standing wave that is represented as a straight line in the mode space, that is to say in an orthogonal reference system having the primary mode as the abscissa axis and the secondary mode as the ordinate axis. It implements a regulator R4 whose output is the command denoted CQ (Control of the vibration Quadrature).

The second excitation signal is determined by the sum of commands CP and CQ.

In order to direct the vibration in a direction other than the azimuthal electrical direction θ=0°, i.e. with a non-zero angle in the modal base of the primary and secondary modes, it is known to use rotation matrices applied to both the detection signals and the excitation signals. These matrices are implemented in the digital processing, made in the DGB for example, preferentially after the ADC for the detection, and before the DAC for the excitation, to minimize the calculation workload by avoiding mathematical multiplication operations on harmonic signals at the frequency of the resonator vibration. The regulator setpoints remain constant.

Figure 5:
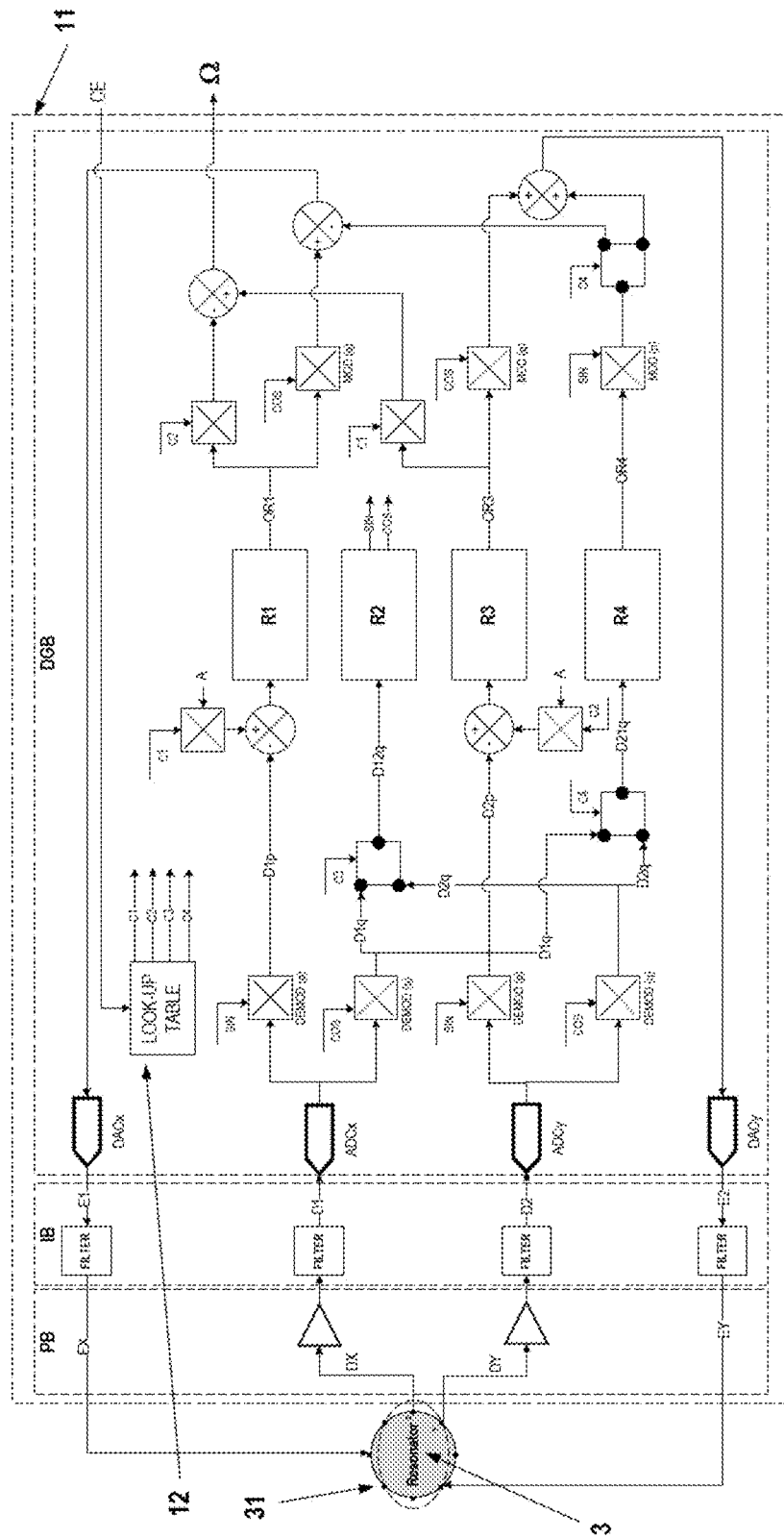
FIG. 5 shows a flowchart of an FTR mode, called all-attitude FTR, in accordance with a preferred embodiment of the method according to the invention.

The present method implements a so-called all-attitude, new FTR mode, referred to as AA FTR, which allows, with respect to the state of the art described hereinabove, a significant reduction of the calculation workload, and hence of the consumption, the component size and the whole cost of the electronics. The expression "all attitude" means that the azimuthal angle θ can take any desired value between 0 and 90°, or even 360°, without thereby using complex mathematical operations. To reword, the main axis of the vibration can be space apart by an azimuthal angle θ with respect to the modal reference direction preferentially defined by the primary mode of the resonator 3, without complex calculations. A preferred embodiment of this AA FTR mode is illustrated by FIG. 5, that will be described hereinafter.

A limit case is obtained when the azimuthal angle is 90°, i.e. θ=90°. The vibration (primary mode) is then aligned with the elements 31Y, 31Y' and the secondary mode is aligned with the elements 31X, 31X'.

This "tailor-made" FTR mode proves highly efficient, and enables in particular the implementation of various sensor error identification techniques, with in fine the calibrations of these errors according to a so-called bias self-calibration mode.

Principle of the All-Attitude FTR Mode

Figure 4:
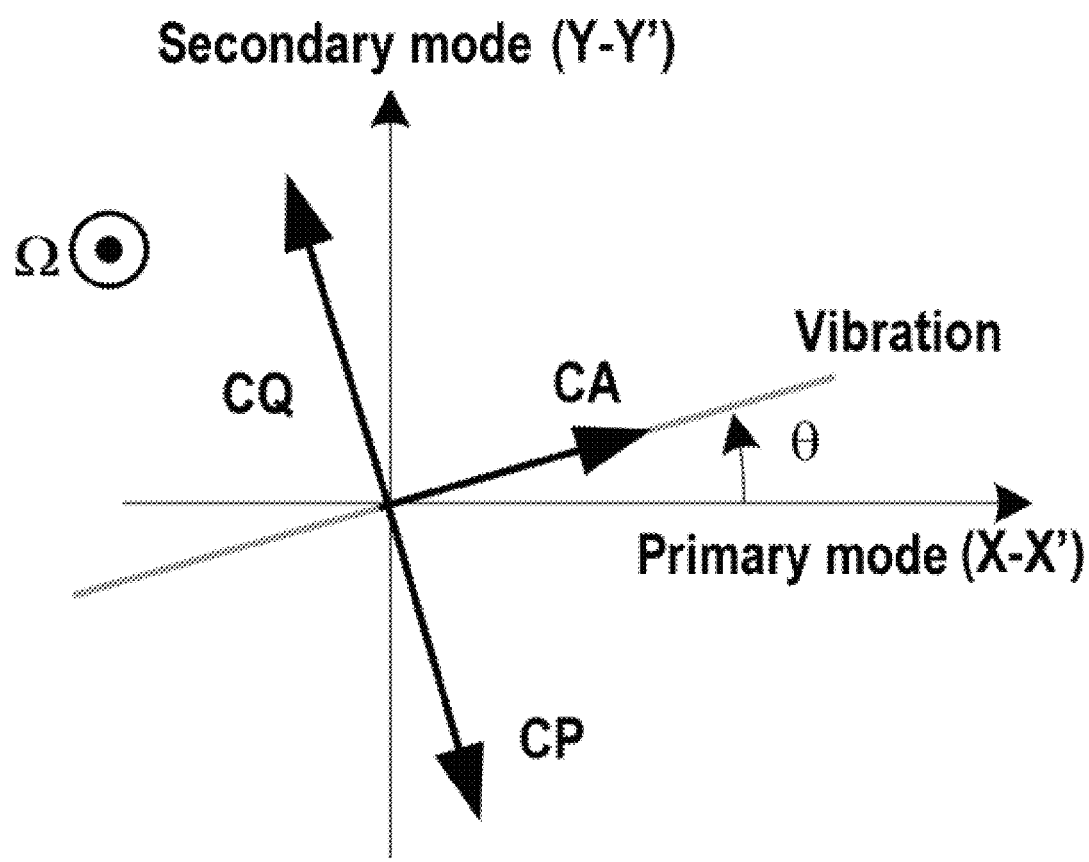
FIG. 4 illustrates how the commands generated by the control loop vary when the azimuthal electrical angle θ is non zero.

With reference to FIG. 4, which shows in the modal plane the direction of the forces generated by the elements 31, the idea is based on the observation that whatever is the vibration direction defined by the azimuthal electrical angle θ, CA is always temporally in phase with CP in time and geometrically orthogonal to CP, and CQ is always temporally in phase quadrature with CA and geometrically collinear to CP.

Each force can then be generated as the action of 2 vectors applied in the orthogonal directions of the primary and secondary modes, with for example for CA a vector aligned with the direction X-X' and of amplitude A×C1, and another vector aligned with the direction Y-Y' and of amplitude A×C2, where C1 and C2 are two coefficients function of θ, called first coefficient and second coefficient, preferentially such that $C1^2+C2^2=1$, which then cleverly leads to control the vibration in amplitude in the direction θ, in such a way that $C1=\cos(\theta)$ and $C2=\sin(\theta)$.

Therefore, whereas the first loop has the setpoint A and the third loop virtually the setpoint 0, these setpoints become A×C1 and A×C2, respectively. This causes the regulator R1 to minimize A×C1−D1p, and the regulator R3 to minimize A×C2−D2p. It is understood that:
- the first loop has, like the third loop, a role of compensation for the Coriolis forces due to the rotation of the resonator 3 exciting the resonance mode perpendicular to the vibration (the secondary mode if θ=0°, the primary mode if θ=90° and a combination of both otherwise);
- the third loop has, like the first loop, a role of vibration amplitude control, for the first loop about the secondary resonance mode axis (projection to the abscissa axis of the modal base by multiplication by cos(θ)), and for the third loop about the secondary resonance mode axis (projection to the abscissa axis of the modal base by multiplication by sin (θ)), see FIG. 3.

The setpoints require no specific processing and it is possible to simply pre-calculate values of C1 and C2 and store them in a table 12 (Look-up Table, or LUT in FIG. 5) that receives in input a setpoint external to DGB, denoted CE, defining a desired angle θ. This external setpoint may program the LUT 12 on a permanent basis (i.e. θ is pre-defined), the output coefficients C1 and C2 being then so-called "factory" fixed coefficients. This external setpoint can also pilot the LUT to obtain variable coefficients C1 and C2, which would cause a precession of the vibration. This external setpoint can also itself provide directly the values of C1 and C2, the LUT simply transferring these values to the regulators. Preferentially, this external setpoint CE requires the LUT to return stored values of coefficients C1 and C2 calculated as sine and cosine functions of an angle θ that then becomes the azimuthal angle taken by the vibration.

As the regulator T3 now plays the same role as the regulator R1, in this new all-attitude FTR mode, the regulator R1 and the regulator R3 can be designed with the same parameters (i.e. the gain, the bandwidth, the frequencies), and, for FIG. 5, the regulator R3 can then be identical to the regulator R1. Therefore, to obtain an azimuthal angle θ=90°, the first loop takes the first coefficient C1=0 (the first loop has then a pure role of compensation of the Coriolis forces) and the third loop takes the second coefficient C2=1, i.e. the setpoint A×C2=A (the third loop has then a pure role of amplitude control). The vibration, with respect to the forces generated by the loops 1 and 3 then take a direction of 45° in the physical reference system, i.e. directed along the axes Y and Y' of FIG. 2. Any intermediate value is possible, as for example C1=√3/2 and C2=½, which would generate an electrical angle of 30°.

As regards the regulator R2 of the PLL, when for example C1=0 and the azimuthal angle takes a value of 90°, taking into account that the initial secondary mode)(θ=0° then takes virtually the role of the primary mode, it becomes necessary to establish the input signal of the regulator R2 from the quadrature signal D2q of the second detection channel. For that purpose, a switch is used upstream from R2, selecting either the signal D1q, or the signal D2q, to establish the input signal D12q of the regulator R2. The control of this switch is also a third coefficient C3 stored in the LUT, which, as C1 and C2, either results from a factory fixed programming, or is defined by an input signal of DGB, denoted CE. Preferentially, C3 allows obtaining a maximum amplitude for the signal D12q. Preferentially, C3 toggles the switch when the azimuthal angle θ takes the value 45°, with, for the azimuthal angle values between 0° and 45°, D12q=D1q, and for the azimuthal electrical angle values between 45° and 90°, D12q=D2q.

As regards the regulator R4 of the quadrature control, similarly to the regulator of the PLL, it is also required to establish its input signal by selecting either the signal D1q, or the signal D2q. Again, a switch is used, and the control of this switch is also a fourth coefficient C4 stored in the LUT, which, as C1 and C2, either results from a factory fixed programming, or is defined by an input signal of DGB, denoted CE. This fourth coefficient C4 can be different from the coefficient C3. Preferentially, this coefficient allows obtaining a maximum amplitude for the input signal D21q of the regulator R4. Preferentially, C4 toggles the switch when the azimuthal angle θ takes the value 45°, with, for the azimuthal angle values between 0° and 45°, $D21q=D2q$, and for the azimuthal electrical angle values between 45° and 90°, $D21q=D1q$.

The output OR4 of the quadrature regulator R4 remains conventionally summed to the output OR3 of the regulator R3 when the azimuthal electrical angle θ is equal to 0°. On the other hand, when the azimuthal electrical angle θ is equal to 90° and the secondary mode becomes virtually the primary mode, the output OR4 of the quadrature regulator R4 must then be summed to the output OR1 of the regulator R1. This is again done using a switch. The command of this switch is advantageously identical to the command of the input switch of R4 (fourth coefficient C4) and can thus be a coefficient different from C3. As an alternative, this coefficient is identical to C3 with a toggling of the switch for an azimuthal electrical angle of 45° in such a way that, when the azimuthal electrical angle takes values between 0° and 45°, this switch sends OR4 towards a summer whose other input signal is the output OR3, and when the azimuthal electrical angle takes values between 45° and 90°, this switch sends OR4 towards a summer whose other input signal is the output OR1, with this time a sign change to take into account the real direction of the quadrature force in the modal reference system.

To conclude, in the presence of a rotation about the measurement axis, this all-attitude FTR mode causes a modulation of the regulators R1 and R3 outputs by the angular velocity Ω. In other words, the regulators R1 and R3 output contains the information Ω because a Coriolis then appears in the direction opposite to the vector Cp in FIG. 4 with a non-zero projection on the axes of the primary and secondary modes, i.e. with a component proportional to −C2 in the primary mode direction, and a component proportional to +C1 in the secondary mode direction. To extract the angular velocity Ω from the signals coming from these regulators, it is then required to multiply the output OR1 of the regulator R1 by the coefficient −C2, to multiply the output OR3 of the regulator R3 by the coefficient C1, and to calculate the difference $OR3 \times C1 - OR1 \times C2$, the setpoints C1 and C2 being preferentially chosen such that $C1^2+C2^2=1$.

To sum up:

Input Side:
- In the first loop, the regulator R1 always takes $D1p$ as an input, i.e. the in-phase component of the primary mode, but aims at minimizing $A \times C1 - D1p$, with C1 a setpoint defined by a LUT 12 controlled or programmed by a signal external to the DGB, denoted CE, rather than just $A - D1p$, $A \times C1$ corresponding as explained to the projection of A to the primary vibration mode axis when $C1=\cos(\theta)$.
- In the second loop, the regulator R2 aims at minimizing $D12q$ with $D12q$ taking the output value of a switch piloted by a setpoint C2 defined by a LUT 12 controlled or programmed by a signal external to the DGB, denoted CE. This switch selects either $D1q$, or $D2q$, depending on the value of the azimuthal electrical angle, i.e. the phase-quadrature component of either the primary mode, or the secondary mode, rather then just $D1q$,
- In the third loop, the regulator R3 always takes $D2p$ as an input, i.e. the in-phase component of the secondary mode, but aims at minimizing $A \times C2 - D2p$, with C2 a setpoint defined by a LUT 12 controlled or programmed by a signal external to the DGB, denoted CE, and preferentially such that $C1^2+C2^2=1$, rather than just $D2p$, $A \times C2$ corresponding as explained to the projection of A to the secondary vibration mode axis when $C2=\cos(\theta)$,
- In the fourth loop, the regulator R4 aims at minimizing $D21q$ with $D21q$ taking the output value of a switch piloted by a setpoint C4 defined by a LUT 12 controlled or programmed by a signal external to the DGB, denoted CE. This switch selects either $D2q$, or $D1q$, depending on the value of the azimuthal electrical angle, i.e. the phase-quadrature component of either secondary mode, or primary mode, rather then just $D2q$.

Output side:
- The outputs OR1 and OR3 of the regulators R1 and R3 both contain part of the angular velocity information. To reconstruct this information, it is required to calculate the difference $OR3 \times C1 - OR1 \times C2$,
- The regulator R2 still outputs the reference harmonic signals SIN and COS, of the phase and phase-quadrature, respectively, of the primary mode when the azimuthal angle is 0°, or of the secondary mode when the azimuthal angle is 90°, or of a combination of the primary mode and the secondary mode representing the state of the vibration when the azimuthal angle is any angle between 0° and 90°,
- Whereas before the output OR4 of the regulator R4 was always summed to the output of the regulator R4, this output OR4, thanks to a switch piloted by the fourth coefficient C4 defined by a LUT controlled or programmed by a signal external to the DGB, denoted CE, is summed either to OR3, or to OR1, depending on the value taken by the azimuthal angle.

Principle of the Continuous All-Attitude FTR Mode

The main drawback of the all-attitude FTR mode described hereinabove is the interruption of the continuous operation of the regulators R2 and R4 caused during the toggling of the switches. Even if this interruption can be made within a very short time, lower than a period of the harmonic signal corresponding to the resonator's sustained vibration, a disturbance of the vibration control system may be generated. Another aspect is also that of the amplitude variation of the input signals of the regulators R2 and R4, whereas the vibration takes different angular positions in the modal plane. This causes performance variation.

Figure 6:
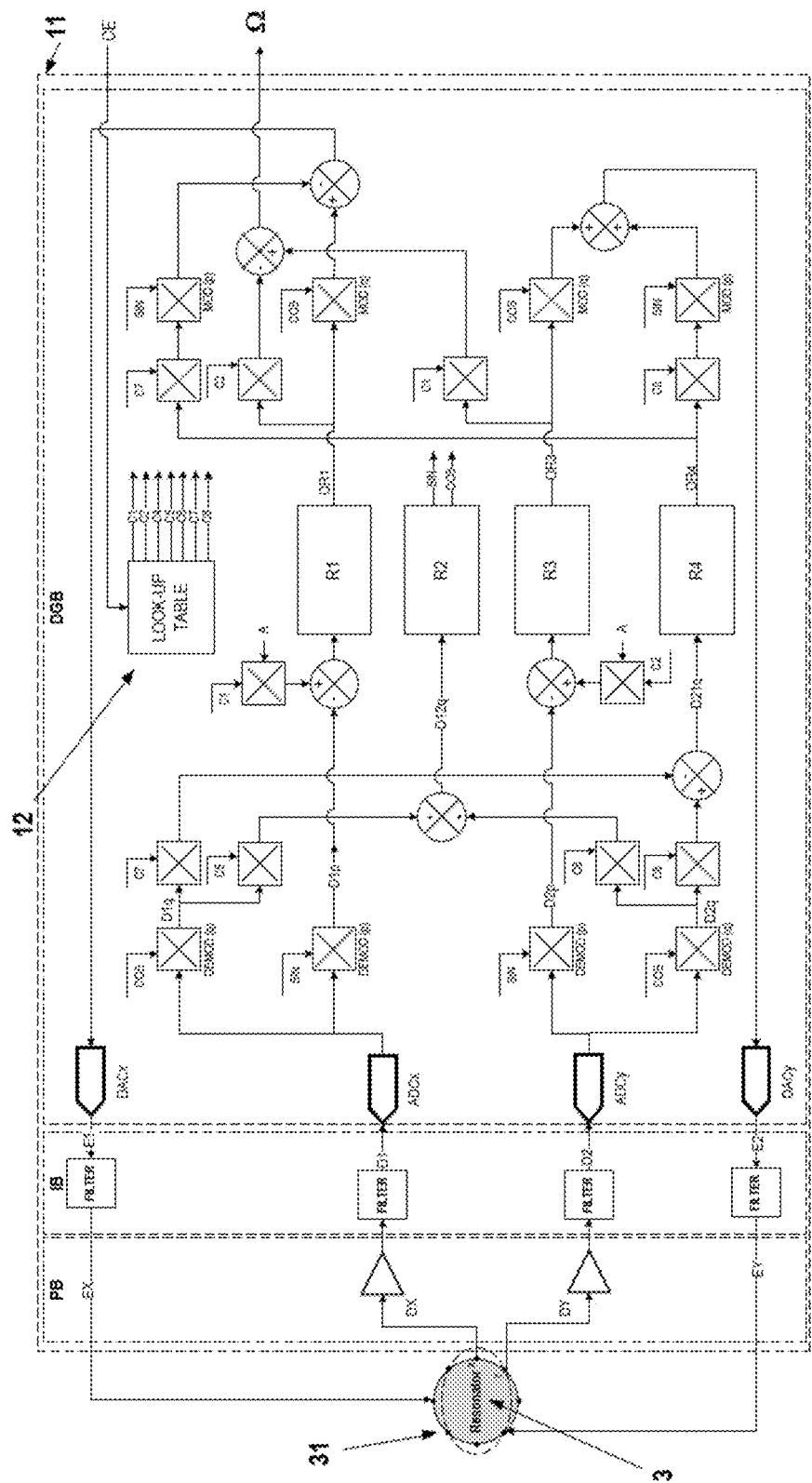
FIG. 6 shows a flowchart of an FTR mode in accordance with another preferred embodiment of the method according to the invention, this FTR mode being called continuous all-attitude FTR, AA FTR.

To remedy this problem, a variant of the principles exposed hereinabove is described by FIG. 6, in which the three switches operating on the regulators R2 and R4 are replaced by calculation elements using other fifth, sixth, seventh and eighth coefficients C5, C6, C7, C8, which, like C1 and C2 whose principles described hereinabove remain unchanged, are preferentially tabulated, i.e. stored in a LUT 12 that receives as an input a setpoint external to the DGB, denoted CE. This external setpoint may program the LUT on a permanent basis, the output coefficients C1, C2, C5, C6, C7 and C8 being then so-called "factory" fixed coefficients. This external setpoint CE may cause the LUT to defined variable coefficients stored in the LUT, or directly transferred from the CE to the regulators, via the LUT, for example. Preferentially, this external setpoint CE requires the LUT 12 to return stored values of coefficients C1, C2, C5, C6, C7 and C8 calculated as sine and cosine functions of an angle θ that then becomes the azimuthal angle taken by the vibration. Consequently, the all-attitude FTR mode becomes continuous.

For this new all-attitude FTR implementation architecture, R3 still plays the same role as that of the regulator R1, and the regulator R1 and the regulator R3 can be designed, preferentially, with the same parameters (i.e. the gain, the bandwidth, the frequencies). The regulator R1 receives the setpoint A×C1 and always tries to minimize A×C1−D1$p$.

The regulator R3 receives the setpoint A×C2 and minimizes A×C2−D2$p$, theses 2 regulators R1 and R3 both controlling the vibration amplitude and cancelling the Coriolis force effect. When the condition $C1^2+C2^2=1$ is respected, the coefficients C1 and C2 can be represented as harmonic functions of the angle θ that defines the angular position of the vibration in the modal plane.

As regards the regulator R2 of the PLL, two new fifth and sixth coefficients C5 and C6 are used to act on the signal D12$q$ that this regulator aims at minimizing. The coefficients C5 and C6 are stored in the LUT 12 and as for C1 and C2, they either result from a "factory" fixed programming, or are defined by an DGB input signal that assigns variable values to them. The external signal piloting the LUT is denoted CE. The regulator then minimizes D12$q$=D1$q$×C5+D2$q$×C6. Preferentially, $C5^2+C6^2=1$. Preferentially, C5=C1 and C6=C2.

The outputs of the regulator 2 remain unchanged and correspond to the reference harmonic signals SIN and COS, of the phase and phase-quadrature, respectively, of the primary mode when the azimuthal angle is 0°, or of the secondary mode when the azimuthal angle is 90°, or of a combination of the primary mode and the secondary mode representing the state of the vibration when the azimuthal angle is any angle between 0° and 90°.

As regards the regulator R4 of the quadrature control, similarly to the PLL regulator, two new seventh and eighth coefficients C7 and C8 are used to act on the signal D21$q$ that this regulator aims at minimizing. The coefficients C7 and C8 are stored in the LUT and as for C1, C2, C5 and C6, they either result from a "factory" fixed programming, or are defined by an DGB input signal CE that assigns variable values to them. The regulator then minimizes D21$q$=D1$q$×C7+D2$q$×C8. Preferentially, $C7^2+C8^2=1$. Preferentially, C7=C2 and C8=C1.

The output OR4 of the regulator R4 is indirectly added to the outputs of the regulators R1 and R3 with a weighting −OR4×C7 for the quantity added to the output of the regulator R1, and a weighting OR4×C8 for the quantity added to the output of the regulator R3. This principle makes it possible to render the vector components of the quadrature force taking into account the angular position of the vibration represented by the azimuthal angle θ.

The estimation of the angular velocity in this continuous mode is identical to the all-attitude case using switches as described hereinabove. In other words, the regulators R1 and R3 output contains the information Ω with a non-zero projection on the axes of the primary and secondary modes, i.e. with a component proportional to −C2 in the primary mode direction, and a component proportional to +C1 in the secondary mode direction. To extract the angular velocity Ω from the signals coming from these regulators, it is then required to multiply the output OR1 of the regulator R1 by a setpoint −C2, to multiply the output OR3 of the regulator R3 by a setpoint C1, and to calculate the difference OR3×C1−OR1×C2.

WA Mode

One of the main known drawbacks of the FTR mode, whether it is standard, or all-attitude, of continuous all-attitude as described hereinabove, is that the rotation measurement domain is limited. Indeed, the more the amplitude of the inertial rotation applied collinearly to the measurement axis of the sensor increases, the more the Coriolis force control electronics, including the electromagnetic coupling elements, has to provide high-value signals opposing to the Coriolis force effect, which is in practice limited by the power voltage of the sensor.

To remedy this situation, the all-attitude FTR mode, or the continuous all-attitude FTR mode described hereinabove, may be transformed into a gyroscope mode, called WA (Whole Angle) mode, for which, theoretically, there is no limitation for the rotation measurement domain.

Figure 7:
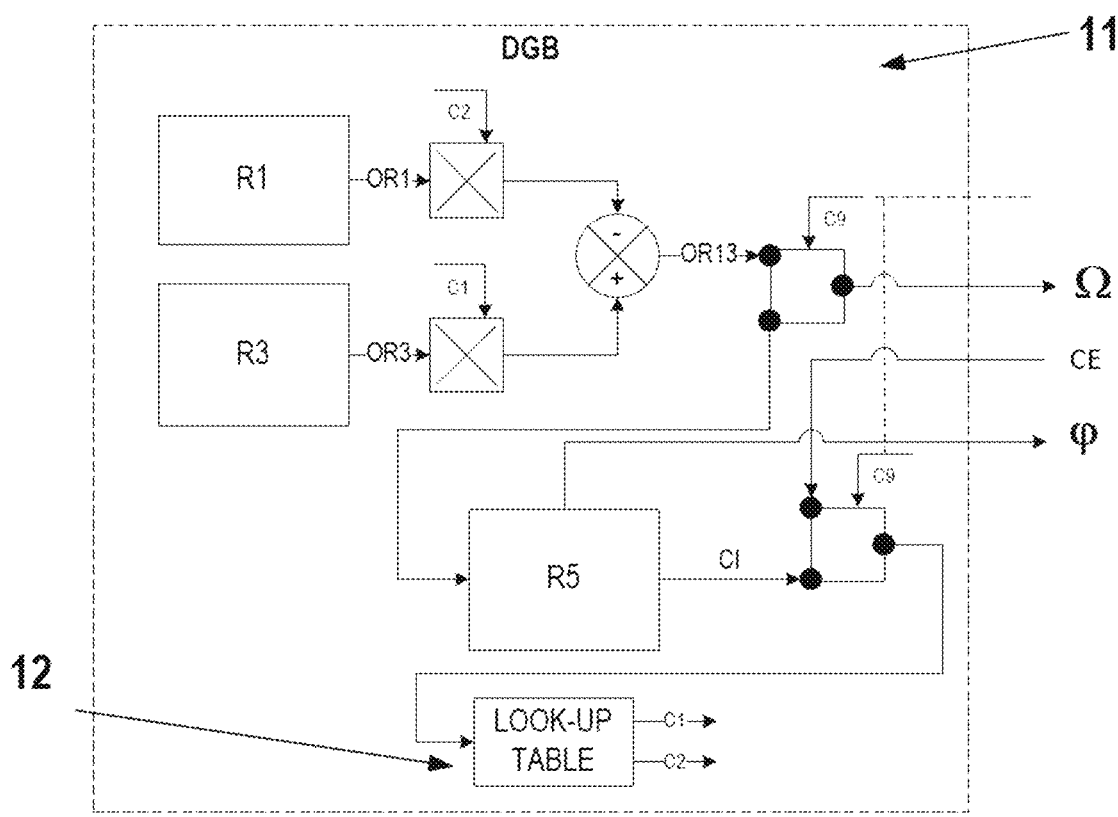
FIG. 7 shows a flowchart of a fifth control loop for a WA gyroscope mode in accordance with a preferred embodiment of the method according to the invention.

With reference to FIG. 7, a fifth loop for controlling said azimuthal angle θ is implemented, using a fifth regulator R5 aiming at minimizing the difference OR13 of the product by C2 of the output OR1 of the first regulator R1 and the product by C1 of the output OR3 of the third regulator R3, where OR13 corresponds to the amplitude of the force CP that must be provided to oppose to the action of the Coriolis forces to the sustained vibration, and hence proportional to the angular velocity Ω about the measurement axis of the vibratory gyroscope sensor 1.

More precisely, the integral of the value of OR13 is proportional to the angular position of the vibratory gyroscope sensor 1, and hence the regulator R5 plays the role of an integrator of the angular velocity of the vibratory gyroscope sensor 1 and has to provide a command CI that makes the LUT 12 send coefficients C1 and C2 such that the force CP is zero. An output of the regulator R5 is the physical rotation angle φ of the vibratory gyroscope sensor 1, proportional to the azimuthal angle θ (in practice, the half).

In this case, the angular position of the vibration is no longer slaved to the resonator, which therefore begins to rotate around the plane of vibration. This corresponds to the gyroscope operating mode.

The coefficients C1 and C2, and C5, C6, C7, C8 are preferentially as explained harmonic coefficients, with C1=C5=C8=cos(θ), C2=C6=C7=sin(θ). The angle θ is the azimuthal angle defining the angular position of the vibration sustained in the modal plane.

It is to be noted that the feedback branch of the fifth loop is not shown in FIG. 7. This branch is derived from the coefficients C1 and C2, as well as C5, C6, C7 and C8, distributed towards the different regulators shown in FIG. 5 or FIG. 6.

This new WA mode has many advantages with respect to the state of the art based on principles presented in the guide IEEE 1431-2004, entitled "IEEE Standard Specification Format Guide and Test Procedure for Coriolis Vibratory Gyros":

It derives directly from the all-attitude FTR or continuous all-attitude FTR mode, The estimation of the physical rotational angle of the vibratory gyroscope sensor 1 results directly from the output of a regulator and hence does not require making complex trigonometric calculations, as for example the arc tangent of the azimuthal angle θ, It is possible to combine the all-attitude FTR mode and the WA mode by implementing a switch piloted by a ninth coefficient C9 represented in FIG. 7 such that, beyond a specified value of angular velocity Ω, the WA mode is activated and the FTR mode is deactivated. Preferentially, the coefficient C9 results from the output of a comparator (not shown in FIG. 7) having for input OR13 and a fixed setpoint value programmed in factory. Preferentially, the coefficient C9 can result from a command external to the device 11.

Method

Figure 8:
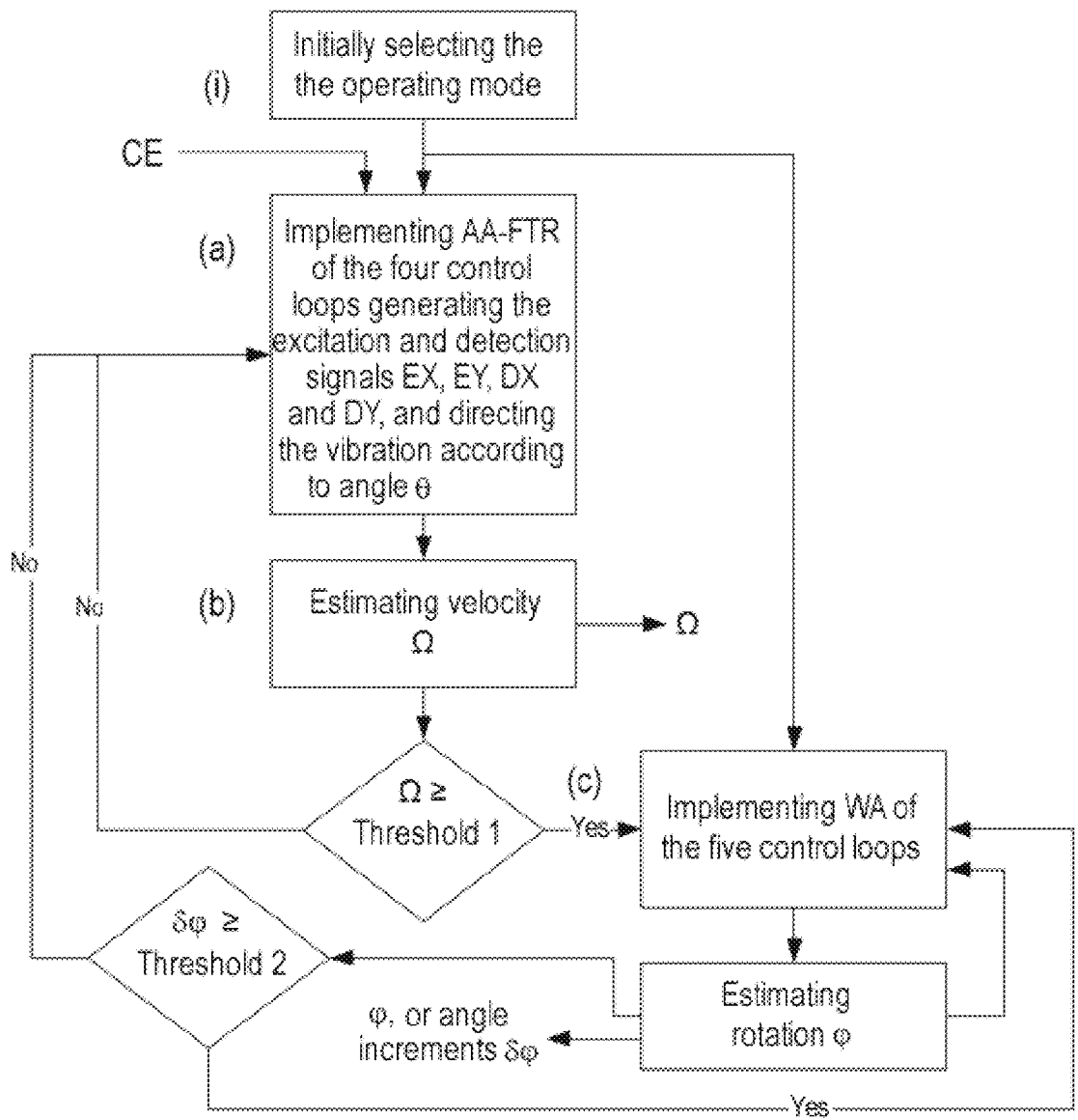
FIG. 8 illustrates the steps of a preferred embodiment of the method according to the invention.

According to a first aspect, with reference to FIG. 8, the present invention proposes a method for measuring an angular velocity of a rotation, and/or an angular position, about a sensitive axis of an axisymmetric vibratory gyroscope sensor 1, which can begin by an optional step of (i) initially selecting an operating mode of the vibratory gyroscope sensor 1, either all-attitude FTR gyrometer (AA FTR), or continuous AA FTR, or Whole Angle (WA) gyroscope, or a combination of these operating modes, AA FTR and WA.

When the AA FTR operating mode (continuous or non-continuous) is selected, the system goes to step (a) that comprises means 11 for processing the signal and data, from the electromechanical coupling instrument 31 of the resonator 3, of the first detection signal DX regarding a vibration of said resonator 3 according to a primary resonance mode, or of the second detection signal DY regarding a vibration of said resonator 3 according to the secondary resonance mode, and generates, using four loops for controlling a first signal EX for exciting the primary resonance mode and a second signal EY for exciting the secondary resonance mode, the physical vibration taking a direction that is non necessarily collinear to the primary and secondary modes.

Originally, during this step (a), the vibratory gyroscope sensor 1 is preferentially based on data storage means 12 comprising a table of pre-calculated values C1 to C9 or variables defined by an external command CE to be used by the data processing means 11 for directing the vibration axis of the resonator 3 along an azimuthal angle θ in the modal plane with respect to a reference direction defined by the primary mode (abscissa axis of the modal plane). The data processing means implement at least four control loops, including:

a first loop for controlling the vibration amplitude of the resonator 3 projected along the primary resonance mode axis and also compensating for the Coriolis force effect, using a first regulator R1, that aims at minimizing the difference between the in-phase component D1$p$ of the first detection signal and the product A×C1 of a vibration amplitude setpoint A of the resonator 3 and a first coefficient C1. The first excitation signal EX is generated as a function of the outputs of the first and the fourth regulator R1, R4.

a second phase-locked loop generating in-phase and phase-quadrature reference harmonic signals with the sustained vibration, for separating said in-phase and phase-quadrature components of the detection signals, using a second regulator R2 (more precisely, step (b) comprises the generation of said phase component and phase-quadrature component from the first and second detection signals by demodulation of the first and second detection signals as a function of the in-phase and phase-quadrature reference harmonic signals with the sustained vibration). In particular, the second regulator R2 aims at minimizing the sum D12$q$ between the product of the phase-quadrature component D1$q$ of the first detection signal by a fifth coefficient C5, and the product of the phase-quadrature component D2$q$ of the second detection signal by a sixth coefficient C6, a third loop for controlling the vibration amplitude of the resonator 3 projected along the secondary mode axis and compensating for the Coriolis force effect, using a third regulator R3, that aims at minimizing the difference between the in-phase component D2$p$ of the second detection signal and the product A×C2 of a vibration amplitude setpoint A of the resonator 3 and a secondary coefficient C2 coming from the table 12. The output of the regulators R1 and R3 contains the information Ω. To extract the angular velocity Ω from the signals coming from these regulators, it is then required to multiply the output OR1 of the regulator R1 by −C2,
to multiply the output OR3 of the regulator R3 by the first coefficient C1, and to calculate the difference OR3×C1−OR1×C2.

a fourth loop for controlling the vibration quadrature of the resonator 3 according to either the secondary resonance mode, or the primary mode, or a combined resonance mode, using a fourth regulator R4, that aims at minimizing the difference D21$q$ between the product of the quadrature component D2$q$ of the second detection signal by an eight coefficient C8, and the product of the quadrature component D1$q$ of the first detection signal by a seventh coefficient C7. Conventionally, the second excitation signal EY is generated as a function of the outputs of the first and the fourth regulator R3, R4.

Preferably, the operating mode may automatically switch from AA FTR to WA, and vice versa. In particular, the AA FTR operating mode switches to the WA operating mode if the estimated angular velocity is higher than a first threshold (denoted Threshold 1), and/or the WA operating mode switches to the AA FTR operating mode if the angular velocity is lower than a second threshold (denoted Threshold 2), preferentially close or identical to the first threshold.

More precisely, in this preferred embodiment, when the measured angular velocity reaches and exceeds the pre-defined measurement threshold, Threshold 1, the output signal of the implementation electronics 11 of the vibratory gyroscope sensor 1, and comprising different signal adaptation and processing functions, either becomes saturated if the AA FTR mode has been selected at step (i), or automatically switches to WA mode for which a fifth control loop is activated using a switch. In this case, the natural output of the system switches from an angular velocity measurement to a rotation angle (angular position) or angle increment measurement. The knowledge of the angle increments rated by an internal clock of the device 11 is a quantity proportional to the angular velocity that, when falling below the second predefined measurement threshold, Threshold 2, causes a switching back from the WA operating mode to the (continuous or non-continuous) AA FTR mode. Threshold 2 may be triggered for an angular velocity corresponding to the first threshold, Threshold 1.

If, during the initial selection step, the operating mode chosen is the WA mode, the 5 regulators are activated from the beginning, with, for the regulator R5, the control of θ and hence the selection of the first and second coefficients C1 and C2 used by the Amplitude/Coriolis regulators R1 and R3, such that these regulators do not generate forces opposing to the Coriolis forces. The vibration is then free, i.e. it is no longer driven by the rotated resonator, and the output of the regulator 5 is angular rotation information □ according to the measurement axis of the vibratory gyroscope sensor 1.

In a step (c), the data processing means 11 estimate said angular velocity and/or said angular position, as a function of the regulator outputs. This step (c) is in practice implemented simultaneously with the other steps.

As shown by FIG. 7:

the angular velocity Ω can be estimated from the outputs OR1 and OR3 of the first and third regulators R1, R3, in particular it is then required to multiply the output OR1 of the regulator R1 by −C2, to multiply the output OR3 of the regulator R3 by the first coefficient C1, and to calculate the difference OR3×C1−OR1×C2; and/or if the fifth regulator is used, the angular position □ can be estimated from the output OR5 of the fifth regulator R5; in practice, it is required to take half the output OR5 of the fifth regulator R5 because this output corresponds to the azimuthal angle θ.

Axisymmetric Vibratory Gyroscope Sensor

According to a second aspect, the invention proposes the vibratory gyroscope sensor 1 for implementing the method according to the first aspect (i.e. for measuring an angular velocity of a rotation, or an angular position, about a sensitive axis).

It conventionally comprises:
- a resonator 3 having an electromechanical coupling instrument 31 for vibrating said resonator according to a first detection signal and a first excitation signal of a primary resonance mode, and a second detection signal and a second excitation signal of a secondary resonance mode;
- data processing means 11 for defining the direction of the vibration in the mode space possibly from an external setpoint CE, and establishing information proportional to either the rotational velocity projected to the measurement axis of the vibratory gyroscope sensor 1, or to the angular rotation of the sensor;
- possibly, data storage means 12 (for storing in particular the table of values of the coefficients C1 and C2, i.e. cos(θ) and sin(θ), as well as possibly C3, C4, C5, C6, C7, C8 and C9).

As explained, it is supposed that the main axis of the vibration according to the primary resonance mode can be spaced apart by an azimuthal angle θ with respect to a reference direction in the mode space defined by the primary resonance modes of the resonator 3, and thus the means 11 are configured to:
- receive, from the electromechanical coupling instrument 31, a first detection signal regarding a vibration of said resonator 3 according to the primary resonance mode, and a second detection signal regarding a vibration of said resonator 3 according to the secondary resonance mode; each of the first and the second detection signal comprising an in-phase component and a phase-quadrature component;
- implementing at least four control loops, including:
  - a first loop for controlling the vibration amplitude of the resonator 3 projected along the primary resonance mode axis and also compensating for the Coriolis forces due to said rotation of the resonator exciting the resonance mode perpendicular to the vibration, using a first regulator R1, the first regulator R1 aiming at minimizing the difference between the in-phase component of the first detection signal and the product by cos(θ) of a vibration amplitude setpoint A of the resonator 3;
  - a second phase-locked loop generating in-phase and phase-quadrature reference harmonic signals of the primary mode for separating said in-phase and phase-quadrature components of the detection signals, using a second regulator R2;
  - a third loop for controlling the vibration amplitude of the resonator projected on the axis of the secondary resonance mode, and also compensating for the Coriolis forces due to said rotation of the resonator 3 exciting the secondary resonance mode, using a third regulator R3, the third regulator R3 aiming at minimizing the difference between the phase component of the second detection signal and the product by sin(θ) of said vibration amplitude setpoint A of the resonator 3;
  - a fourth loop for controlling the quadrature of a resonance mode perpendicular to the vibration of the resonator, i.e. either the primary mode, or the secondary mode, or a combined resonance mode, and using a fourth regulator R4;
  - a possible fifth loop playing the role of an integrator of the angular velocity of the vibratory gyroscope sensor 1 and providing a command piloting the setpoints of the regulators R1, R3 such that no force is opposite to the Coriolis forces. An output of the regulator R5 is the physical rotation angle □ of the vibratory gyroscope sensor 1;
- estimating said angular velocity, and/or the angular position, as a function of at least the outputs of the first regulator, the third regulator, and as the case may be the fifth regulator;

Computer Program Product or Program Product of a Programmable Logic Circuit

According to a third and a fourth aspect, the invention relates to a computer program product or program of a programmable logic circuit comprising code instructions for executing (in particular on the data processing means 11) a method according to the first aspect of the invention for measuring the angular velocity of a rotation, or an angular position, about a sensitive axis of a vibratory gyroscope sensor 1, as well as computer-readable storage means on which is recorded a computer program product or program of a programmable logic circuit.

The invention claimed is:

1. A method for measuring an angular velocity of a rotation and/or an angular position, about a sensitive axis of an axisymmetric vibratory gyroscope sensor (1), comprising the implementation, by means (11) for processing data from the axisymmetric vibratory gyroscope sensor (1), of steps of:

(a) receiving, from an electromechanical coupling instrument (31) of a resonator (3) of the axisymmetric vibratory gyroscope sensor (1), a first detection signal regarding a vibration of said resonator (3) according to a primary resonance mode, and a second detection signal regarding a vibration of said resonator (3) according to a secondary resonance mode; each of the first and the second detection signal comprising an in-phase component and a phase-quadrature component; said resonator (3) being vibrated via said electromechanical coupling instrument (31) according to a first signal for exciting the primary resonance mode and a second signal for exciting the secondary resonance mode;

(b) implementing at least four control loops, including:
- a first loop for controlling the vibration amplitude of the resonator (3) about the primary resonance mode axis, using a first regulator (R1);
- a second phase-locked loop generating in-phase and phase-quadrature reference harmonic signals of the primary mode and/or secondary mode, for separating said in-phase and phase-quadrature components of the detection signals, using a second regulator (R2);
- a third loop for compensating for the Coriolis forces which are due to said rotation of the resonator (3) and which excite a resonance mode perpendicular to the vibration, using a third regulator (R3);
- a fourth loop for controlling the quadrature of said resonance mode perpendicular to the resonator vibration, using a fourth regulator (R4);

(c) estimating said angular velocity and/or said angular position, as a function of the regulator outputs;

characterized in that the vibration is constrained by the first and second excitation signals to have an azimuthal angle θ in the orthogonal modal base of the primary and secondary modes, the first regulator (R1) is configured to minimize the difference between the in-phase component of the first detection signal and the product of a first coefficient C1 that is a function of the azimuthal angle θ and a setpoint vibration amplitude of the resonator (3), and the third regulator (R3) is configured to minimize the difference between the in-phase component of the second detection signal and the product of a second coefficient C2 that is function of the azimuthal angle θ and said setpoint vibration amplitude of the resonator (3), the first loop being also a Coriolis force compensation loop and the third loop being also a loop for controlling the vibration amplitude of the resonator (3) about the secondary resonance mode axis.

2. The method according to claim 1, characterized in that the first and second coefficients C1 and C2 satisfy $C1^2+C2^2=1$.

3. The method according to claim 2, characterized in that the first and second coefficients C1 and C2 satisfy $C1=\cos(\theta)$ and $C2=\sin(\theta)$, where θ is said azimuthal angle.

4. The method according to claim 1, characterized in that the first regulator (R1) and the third regulator (R3) are identical.

5. The method according to claim 1, characterized in that the second regulator (R2) is configured to minimize the sum of the product of a fifth coefficient C5 that is a function of the azimuthal angle θ and the phase-quadrature component of the first detection signal, and the product of a sixth coefficient C6 that is a function of the azimuthal angle θ and the phase-quadrature component of the second detection signal.

6. The method according to claim 5, characterized in that the fifth and sixth coefficients C5 and C6 satisfy $C5^2+C6^2=1$.

7. The method according to claim 6, characterized in that the fifth and sixth coefficients C5 and C6 satisfy $C5=C1$, and $C6=C2$.

8. The method according to claim 5, characterized in that the axisymmetric vibratory gyroscope sensor (1) comprises data storage means (12) storing a table of pre-calculated values of the coefficients C1, C2, C5, and C6, used by the data processing means (11).

9. The method according to claim 1, characterized in that said angular velocity is estimated at step (c) by calculating the difference OR13 of the product of the second coefficient C2 and the output of the first regulator (R1) and the product of the first coefficient C1 and the output of the third regulator (R3).

10. The method according to claim 1, characterized in that the step (b) comprises the implementation of a fifth loop for controlling said azimuthal angle θ providing a command adjusting the setpoints of the regulators (R1, R3) of the first and third loops, using a fifth regulator (R5).

11. The method according to claim 10, characterized in that said angular position is estimated at step (c) as a function of the output of the fifth regulator (R5).

12. The method according to claim 11, characterized in that the fifth regulator (R5) is configured to minimize the difference OR13 of the product of the second coefficient C2 and the output OR1 of the first regulator (R1) and the product of the first coefficient C1 and the output OR3 of the third regulator (R3).

13. A computer program product comprising code instructions for executing a method according to claim 1 for measuring the angular velocity and/or an angular position about a sensitive axis of an axisymmetric vibratory gyroscope sensor (1), when said program is executed on a computer.

14. A computer-readable storage means on which is recorded a computer program product comprising code instructions for executing a method according to claim 1 for measuring the angular velocity and/or an angular position about a sensitive axis of an axisymmetric vibratory gyroscope sensor (1).

15. A method for measuring an angular velocity of a rotation and/or an angular position, about a sensitive axis of an axisymmetric vibratory gyroscope sensor (1), comprising the implementation, by means (11) for processing data from the axisymmetric vibratory gyroscope sensor (1), of steps of:
(a) receiving, from an electromechanical coupling instrument (31) of a resonator (3) of the axisymmetric vibratory gyroscope sensor (1), a first detection signal regarding a vibration of said resonator (3) according to a primary resonance mode, and a second detection signal regarding a vibration of said resonator (3) according to a secondary resonance mode; each of the first and the second detection signal comprising an in-phase component and a phase-quadrature component; said resonator (3) being vibrated via said electromechanical coupling instrument (31) according to a first signal for exciting the primary resonance mode and a second signal for exciting the secondary resonance mode;
(b) implementing at least four control loops, including:
  a first loop for controlling the vibration amplitude of the resonator (3) about the primary resonance mode axis, using a first regulator (R1);
  a second phase-locked loop generating in-phase and phase-quadrature reference harmonic signals of the primary mode and/or secondary mode, for separating said in-phase and phase-quadrature components of the detection signals, using a second regulator (R2);
  a third loop for compensating for the Coriolis forces which are due to said rotation of the resonator (3) and which excites a resonance mode perpendicular to the vibration, using a third regulator (R3);
  a fourth loop for controlling the quadrature of said resonance mode perpendicular to the resonator vibration, using a fourth regulator (R4);
(c) estimating said angular velocity and/or said angular position, as a function of the regulator outputs;
characterized in that the vibration is constrained by the first and second excitation signals to have an azimuthal angle θ in the orthogonal modal base of the primary and secondary modes, the first regulator (R1) is configured to minimize the difference between the in-phase component of the first detection signal and the product of a first coefficient C1 that is a function of the azimuthal angle θ and a setpoint vibration amplitude of the resonator (3), and the third regulator (R3) is configured to minimize the difference between the in-phase component of the second detection signal and the product of a second coefficient C2 that is a function of the azimuthal angle θ and said setpoint vibration amplitude of the resonator (3), the first loop being also a Coriolis force compensation loop and the third loop being also a loop for controlling the vibration amplitude of the resonator (3) about the secondary resonance mode axis, said method comprising a step of selecting an operating mode among at least one Whole Angle, WA, mode, in which a fifth control loop for controlling said azimuthal angle θ is implemented, said fifth control loop being included in said step (b) and providing a command adjusting the setpoints of the regulators (R1, R3) of the first and third loops, using a fifth regulator (R5) and one all-attitude Force-To-Rebalance, AA FTR, mode, in which said azimuthal angle θ has a value selected manually, whereas the fifth control loop is not implemented.

16. The method according to claim 15, characterized in that said selection of an operating mode is made as a function of the result of the comparison between the estimated angular velocity and at least one threshold.

17. The method according to claim 16, characterized in that:
the AA FTR operating mode switches to the WA operating mode if the estimated angular velocity is higher than a first threshold;
the WA operating mode switches to the AA FTR operating mode if the angular velocity is lower than a second threshold.

18. The method according to claim 17, characterized in that the second threshold is identical to the first threshold.

19. An axisymmetric vibratory gyroscope sensor (1) for measuring an angular velocity or a rotation about a sensitive axis, comprising:
a resonator (3) having an electromechanical coupling instrument (31) for vibrating said resonator according to a first excitation signal coming from a primary resonance mode and a second excitation signal coming from a secondary resonance mode; and
a data processing means (11) configured to:
receive, from the electromechanical coupling instrument (31), a first detection signal regarding a vibration of said resonator (3) according to the primary resonance mode, and a second detection signal regarding a vibration of said resonator (3) according to the secondary resonance mode; each of the first and the second detection signal comprising an in-phase component and a phase-quadrature component;
implement at least four control loops, including:
a first loop for controlling the vibration amplitude of the resonator (3) about the primary resonance mode axis, using a first regulator (R1);
a second phase-locked loop generating in-phase and phase-quadrature reference harmonic signals of the primary mode and/or secondary mode, for separating said in-phase and phase-quadrature components of the detection signals, using a second regulator (R2);
a third loop for compensating for the Coriolis forces which are due to said rotation of the resonator (3) and which excite a resonance mode perpendicular to the vibration, using a third regulator (R3);
a fourth loop for controlling the quadrature of said resonance mode perpendicular to the resonator vibration, using a fourth regulator (R4);
estimate said angular velocity and/or the angular position as a function of the regulator outputs;
characterized in that the vibration is constrained by the first and second excitation signals to have an azimuthal angle θ in the orthogonal modal base of the primary and secondary modes, the first regulator (R1) is configured to minimize the difference between the in-phase component of the first detection signal and the product of a first coefficient C1 that is a function of the azimuthal angle θ and a setpoint vibration amplitude of the resonator (3), and the third regulator (R3) is configured to minimize the difference between the in-phase component of the second detection signal and the product of a second coefficient C2 that is a function of the azimuthal angle θ and said setpoint vibration amplitude of the resonator (3), the first loop being also a Coriolis force compensation loop and the third loop being also a loop for controlling the vibration amplitude of the resonator (3) about the secondary resonance mode axis.

* * * * *